United States Patent [19]
Allen

[11] 3,913,798
[45] Oct. 21, 1975

[54] ATTACHABLE PRECISION UNIT FOR SEED PLANTERS

[76] Inventor: Steve R. Allen, 2209 Southside Drive, Montebello, Calif. 90640

[22] Filed: Oct. 18, 1973

[21] Appl. No.: 407,415

[52] U.S. Cl. ............... 222/281; 222/412; 222/414; 221/222; 198/64
[51] Int. Cl.² ........................................ B65G 33/06
[58] Field of Search .......... 222/412, 414, 281, 272; 221/75, 222, 173; 198/64, 127 R, 213, 214

[56] References Cited
UNITED STATES PATENTS

| | | | |
|---|---|---|---|
| 140,965 | 7/1893 | Svendsen | 222/413 UX |
| 353,727 | 12/1886 | Woodbury | 222/281 |
| 1,894,058 | 1/1933 | Rice | 222/414 UX |
| 3,426,881 | 2/1969 | Dwyer | 198/127 R |
| 3,710,921 | 1/1973 | Petiet | 221/75 X |
| 3,784,065 | 1/1974 | Platfoort | 222/413 |

Primary Examiner—Stanley H. Tollberg
Assistant Examiner—Frederick R. Handren
Attorney, Agent, or Firm—Lawrence Fleming

[57] ABSTRACT

A precision seed-feeding or planting attachment for agricultural machines, which will dispense seeds one-by-one, including seeds of small size or irregular shape. Seeds from a supply drop onto a pair of rollers, which are rotating in opposite senses with their adjacent surfaces each moving upward. The gap between the rollers is too small for seeds to fall through. Fixed, generally parallel control guides confine the seeds to a central zone. The motion of the rollers maneuvers the seeds into a row moving single-file along between the guides, whence they drop one-by-one into a delivery tube. The axial, single-file motion may be effected by inclining the axes of the rollers, or by providing helical grooves in one or both rollers.

6 Claims, 7 Drawing Figures

U.S. Patent    Oct. 21, 1975    Sheet 1 of 2    3,913,798
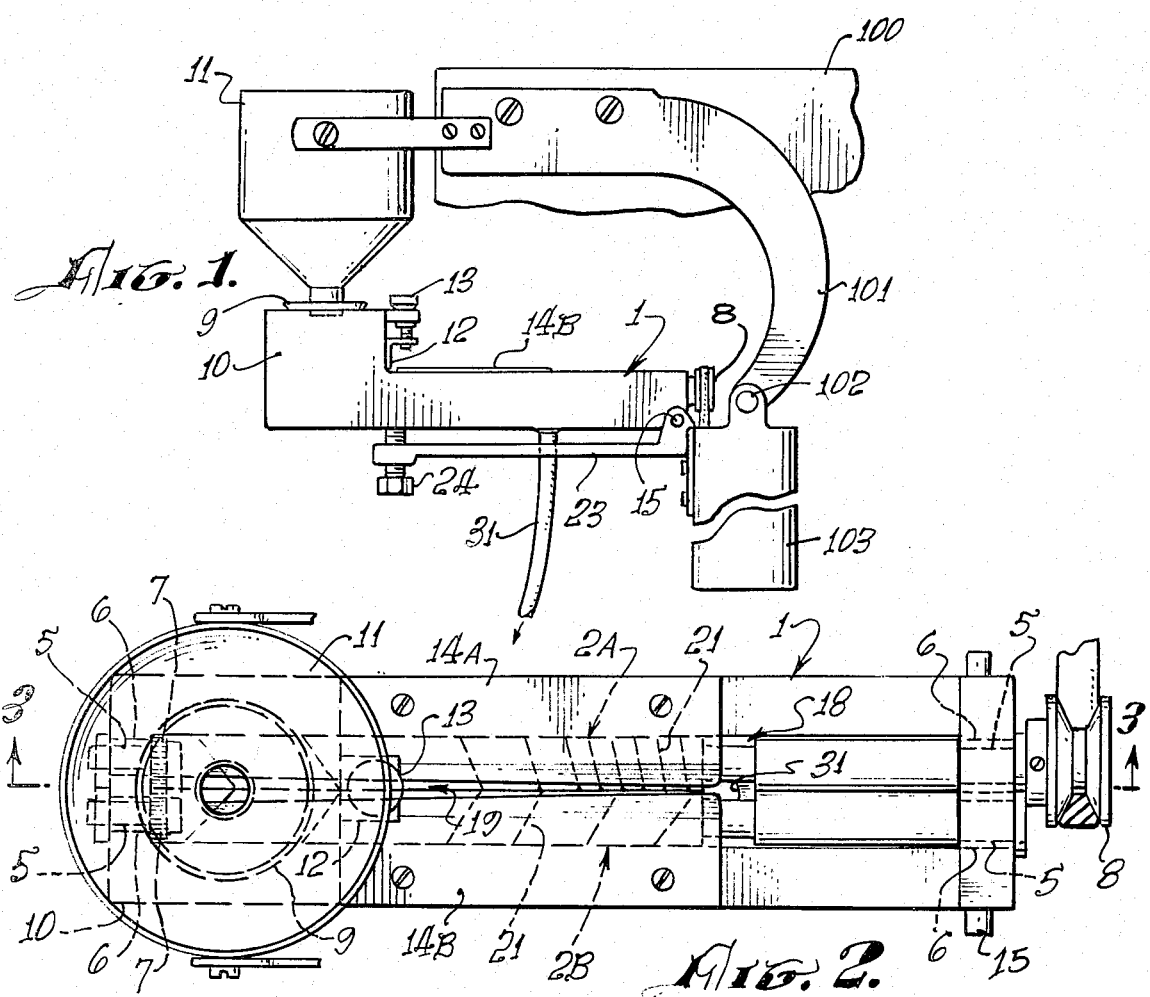
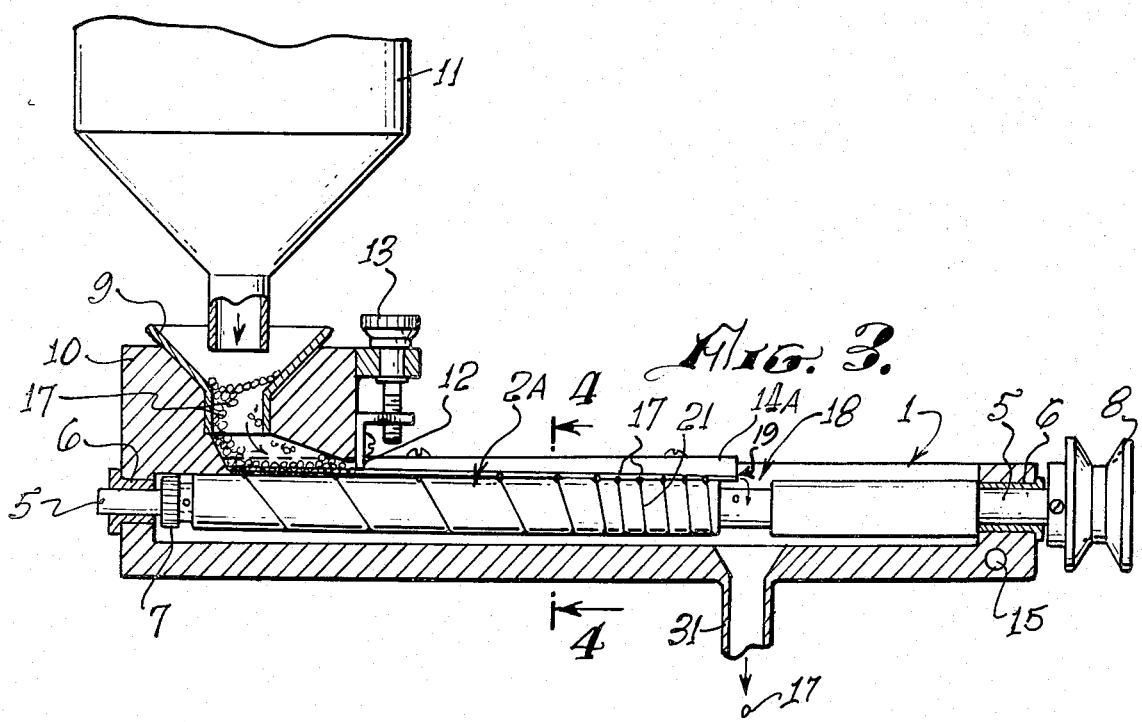

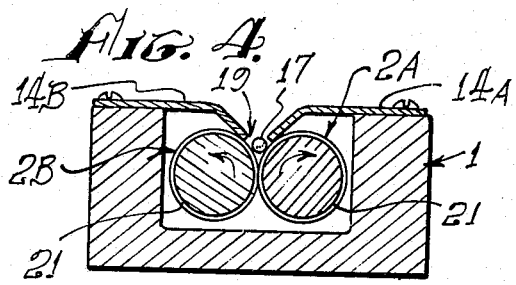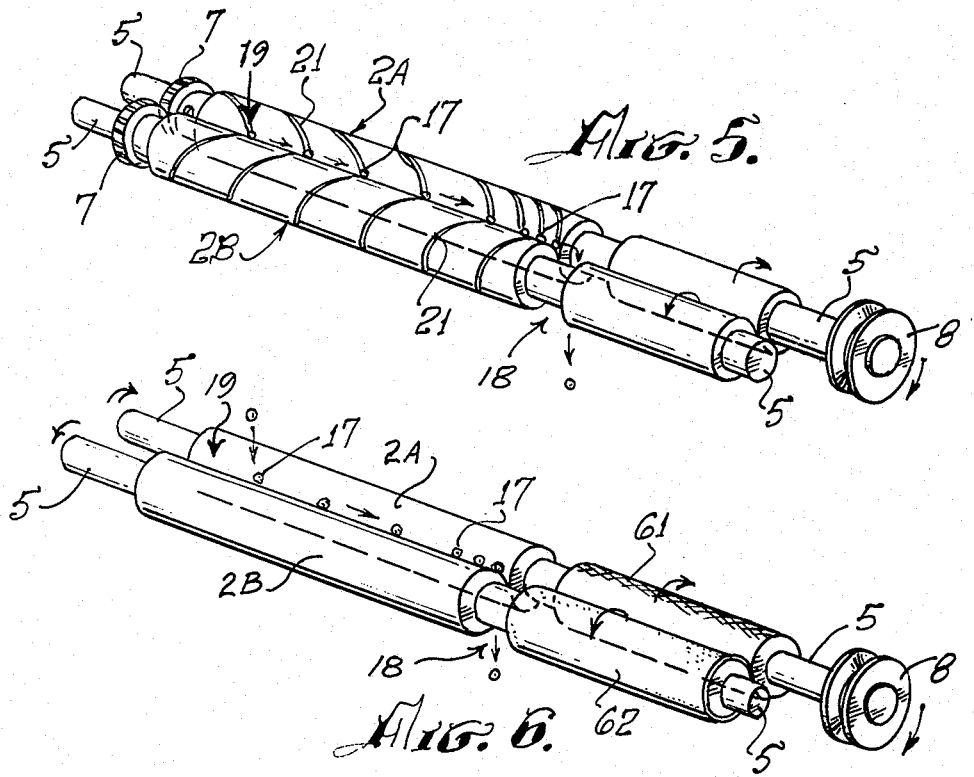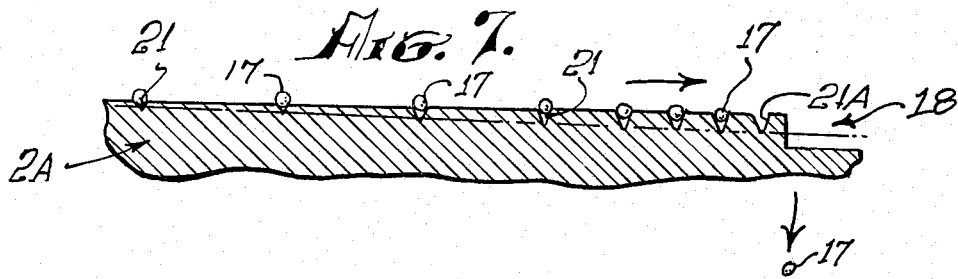

ATTACHABLE PRECISION UNIT FOR SEED PLANTERS

BACKGROUND

Precision seed planters are known which work satisfactorily on the "easy-to-plant" kinds of seed such as corn, beans, peas, and processed or "pelletized" seeds. There is a need, however, for a machine which will plant precisely, i.e., singly or in substantially-known numbers, the "hard-to-plant" seeds. Such seeds are relatively small or flat or of irregular or complicated shape. Examples are the seeds of flowers, lettuce, onions, canteloupes, and cucumbers. It is therefore desirable to provide a compact precision-planting unit which may be conveniently attached to or built onto planting machinery of existing types, to permit machine-planting of the above "hard-to-plant" kinds of seeds.

Such a unit effects savings on seed costs, and in the cost of hand labor previously required to thin the growing plants and to bring them to a desirable stand in the planted row.

BRIEF SUMMARY

This invention is an improved seed-feeding or dispensing unit for planting machinery. It provides novel means to receive seeds from a supply chamber and dispose them in a single-file line which moves uniformly to a seed discharge tube. It operates with hard-to-plant seeds, of small size and/or complicated shape, as well as with seeds of more spherical shape which may roll, such as corn and peas. The invention provides for a pair of cylindrical rollers and stationary control guides. The rollers rotate in opposite directions, with their upper portions moving outward, and are mounted on substantially parallel axes, close enough together so that the seeds cannot fall in between them. Seeds are delivered from above into the central zone between the rollers, through an adjustable gate and between the control guides.

The counter-rotating rollers manipulate or "juggle" the seeds into a single-file formation. This single file is caused to move axially along the rollers and between the guides. The axial motion may be caused by inclination of the axes of the assembly from the horizontal, or by providing helical grooves in one or both of the rollers. Coming to a gap in the rollers, the seeds then drop into a discharge tube for planting.

Smooth rollers are preferred for use with small seeds of complex shape or with flat seeds. Seeds of relatively spherical shape are preferably used in the form of the invention which provides helically-grooved rollers. The grooves may vary in axial pitch, and also in depth, along their lengths, in a manner best to handle seeds of predetermined diameters.

Apparatus according to the invention may provide for interchangeable rollers and related parts, in order to precision-plant different kinds of seeds as desired. The rate of delivery of seeds may be controlled, as by varying the inclination of the rollers from the horizontal, their rotational speed, and the size of the opening in the seed supply gate.

DETAILED DESCRIPTION

In the drawing:

FIG. 1 is a simplified side view of a precision planting unit according to the invention, shown attached to a portion of another agricultural machine;

FIG. 2 is a top view of a unit according to the invention;

FIG. 3 is a section taken on line 3—3 of FIG. 2;

FIG. 4 is a section taken on line 4—4 of FIG. 3;

FIG. 5 is a partial perspective view showing a pair of rollers geared together and having helical grooves;

FIG. 6 is a partial perspective view showing a pair of smooth rollers; and

FIG. 7 is a partial enlarged sectional view showing portions of a groove in a roller, which varies in pitch and depth.

In FIG. 1, there is shown a precision planting unit according to the invention, having a body or frame 1. It is shown attached to an existing prior machine, portions of which are shown: part of a frame member 100, a planter bracket 101, a seed supply hopper or chamber 11, a stabilizer weight 103, a pivot 102, and a stabilizer bracket 23. The unit 1 of the invention is mounted to the stabilizer bracket 23 by an inclination-adjusting pivot 15, and its angle with respect to that pivot may be adjusted by an inclination-adjusting screw 24. The stabilizer bracket 23 on the prior machine 100, etc., is maintained substantially horizontal or level at all times by the stabilizer weight 103, whether the land is level or not. Thus the inclination of the unit of the invention, 1, may be adjusted with respect to level by means of adjusting screw 24. Such inclination, when the unit 1 is equipped with non-grooved or smooth rollers, may be adjusted by screw 24 to control the rate at which the unit 1 delivers seeds.

FIG. 2 is a top view of a precision planting unit according to the invention, with body 1. The seed supply chamber 11 of the prior machine is shown in top view. Control guides 14A and 14B are shown, between which the seeds travel. A driving pulley 8 on the end of a shaft 5 which carries a cylinder or roller 2A, and pivot pin 15 which connects body 1 to stabilizer bracket 23 (FIG. 1) are shown. Below the control guides 14A, 14B, are indicated in dotted lines the cylinders or rollers 2A, 2B. The channel or channel-like space through which the seeds travel is indicated at 19. A portion of each roller 2A, 2B is reduced in diameter to provide a seed drop slot or space 18, through which the seeds may drop to a delivery tube 31, shown better in FIG. 3.

FIG. 3 shows the position of the feeder section 10 of the unit, resting on the upper end of the body 1 and directly under the prior seed supply hopper 11. Vertical inlet tube 9 is shown, with a small portion of the seed channel 19 exposed through the drop slot or opening 18. A seed supply gate 12 may be adjusted up and down to admit seeds of various sizes by means of an adjusting screw 13.

FIG. 3 being a side sectional view, one of the rollers 2A, is visible. This one is of the kind having helical grooves 21 of varying pitch. Seeds 17 are shown in the grooves. The shaft 5 of the roller 2A is carried in bearings 6 of any suitable type. On the end of shaft 5 is a pulley 8, which may be driven by a belt from some other suitable pulley or the like on the prior machine 100, FIG. 1. The other roller, 2B is not visible in FIG. 3. It may be driven from gear 7.

FIG. 4 shows a pair of rollers 2A, 2B in section. They rotate on substantially parallel axes with substantially no clearance between them. They may have helical grooves 21. Mounted to the frame 1 are the control guides 14A, 14B, defining a narrow elongated space or area or channel 19 above the juncture between the rollers. A seed 17 is shown in this channel. The directions or senses of rotation of the rollers are indicated by arrows, "top outward". It will be seen that the seed 17 is rolled, or slid or juggled about by the upward and outward motion of the rollers 2A, 2B; but it is prevented from being carried outward by the lips of the control guides 14A, 14B, which are disposed close to the roller surfaces. The particular rollers shown in FIG. 4 are of the type having grooves 21, but the structure of FIG. 4 applies as well to rollers which are not grooved. The above action of the rollers 2A, 2B in cooperation with the control guides 14A, 14B, is found to maneuver the seeds 17 into a single-file formation, whence they fall into the drop slot or space 18 (FIGS. 2, 3, 5, 6) to the delivery tube 31. The space or channel 19 between the control guides 14A, 14B is made just wide enough to admit the seeds in single-file.

Most of the interchangeable parts such as the vertical inlet 9, the control guides 14A and 14B, and grooved cylinders or rollers 2A, 2B are designed according to the size and shape of the kind of seed to be planted.

FIG. 5 shows the two cylinders or rollers 2A, 2B in operating relation outside the body or frame 1. These rollers are of the modification having helical grooves 21, and are rotated oppositely by gears 7, which keep the grooves 21 in appropriate synchronism. Seeds 17, delivered into the juncture space 19 where the two rollers are substantially tangent to each other, are picked up in the grooves 21 and carried along toward the drop slot 18. They are restrained from being carried around the rollers by the control guides 14A, 14B, shown in FIG. 4 but not in FIG. 5. The inclination of the axes of the rollers is relatively unimportant when the rollers are provided with grooves 21, since the grooves themselves determine the axial progression of the seeds from the entry point, which is toward the left-hand portion of FIG. 5, to the drop slot 18.

The grooves 21 are preferably made to increase in depth and to have finer pitch toward the exit end. The pitch is indicated in FIG. 5 and the depth in FIG. 7. Grooved rollers 2A, 2B are preferred for dealing with seeds of a shape that will roll, such as peas. In operation, the speed of the drop (spacing in the planted row) is controlled by the speed of rotation of the rollers 2A, 2B relative to the ground speed of the traveling machine. The grooves 21 may be single or multiple, corresponding to single or multiple threads on a screw. A single-grooved cylinder or roller drops one seed per revolution, and a multiple-grooved cylinder (not shown) of, say 2, 3, or 4 grooves, will drop 2, 3, or 4 seeds per revolution.

For seeds of shapes that do not roll, e.g., flattish, it is preferred to employ smooth or ungrooved rollers, FIG. 6. Here, the seeds 17 are fed into the juncture space or area between the rotating rollers at 19 as before, and restrained into a channel 18 (not shown) by the control guides 14A, 14B, not shown in FIG. 6 but visible in FIGS. 2–4. In this FIG. 6 form of the invention, the rate of delivery of seeds into the delivery tube 31 via the drop space or slot 18, is a function of the rate of progression of the single file of seeds as determined by gravity, i.e., the inclination of the axis of each roller 2A, 2B to the level or horizontal. This inclination may be adjusted to get the desired rate by adjusting the screw 24, FIG. 1. The rate of delivery of the seeds in this form of the invention depends obviously on the inclination of the axes and on the speed of rotation of the rollers 2A, 2B, as may be determined by the appropriate choice of drive ratio to the pulley 8, which permits control of the number of seeds delivered per foot of progress of the machine along the row being planted.

In FIG. 6, the rollers 2A, 2B need not rotate in synchronism, and so may be connected by a friction drive instead of gears such as 7. To provide the friction drive, surfaces 61, 62 may be provided with engaging anti-slip surfaces such as coatings of rubber.

FIG. 7 illustrates a portion of a roller 2A in section, with groove 21 of varying pitch and depth. A seed 17 is picked up in the groove 21 at the left-hand end of the roller and carried to the right, dropping out as it reaches the slot or opening 18 as it traverses the terminal portion of the groove 21 as at 21A, and then dropping into the delivery tube 31 (FIG. 3). The geometry of groove 21, as noted above, is, for best results, designed according to the geometry of the seeds to be handled; the grooved form of the invention is preferred for use with seeds so shaped that they will roll. The grooves 21 prevent rolling down the channel 19, and control positively the progressive motion of such seeds.

Referring back to FIG. 2, the control guides 14A, 14B may be shaped so that the channel or space 19 between them is somewhat tapered. The degree of taper may be small, e.g., 1:1000. FIG. 2 exaggerates the taper for ease of illustration.

When a seed progresses along the channel or space 19 on rollers 2A, 2B which are not grooved, the seed is slowed down when it contacts and rubs along one of the control guides such as 14A, 14B. This permits one or more of the free-moving seeds behind it to close up the gap, so that the seeds emerge in single file with substantially even spacing.

I claim:
1. A seed feeding unit comprising:
   a pair of rollers on substantially parallel axes and substantially in mutual contact, said rollers defining a drop slot adjacent the ends thereof;
   means to rotate said rollers in opposite senses with their top portions moving apart, the adjacent surface elements of said rollers defining an elongated area of juncture;
   means to introduce seeds downward into said area adjacent one end of said rollers, said seeds engaging moving surfaces thereof;
   progression means to cause said seeds to progress along said area to a discharge end and drop slot, and
   stationary control guides having edge portions extending along and close to said rollers and defining a guide slot,
   said guide slot being relatively narrow and cooperating with said rollers to dispose said seeds into a single file as they progress along said area toward said discharge end,
   said seeds dropping through said drop slot into a delivery means for planting.
2. Apparatus as in claim 1, wherein:
   said progression means comprises means to incline the axes of said rollers to the horizontal to move said seeds axially along by gravity,
   said rollers being substantially smooth.

3. Apparatus as in claim 1, wherein:
said progression means comprises helical grooves in at least one of said rollers,
said grooves engaging said seeds to move them axially.

4. Apparatus as in claim 3, wherein:
said grooves vary in axial pitch along said rollers, said pitch being closer toward the discharge end thereof.

5. Apparatus as in claim 3, wherein:
said grooves vary continuously in depth along said rollers, said depth increasing toward said discharge end.

6. Apparatus as in claim 1, wherein:
said control guides are shaped to make said guide slot slightly tapered in width along said area.

* * * * *